United States Patent
Skjæveland

(10) Patent No.: US 9,485,897 B2
(45) Date of Patent: Nov. 8, 2016

(54) ASSEMBLY FOR ATTACHING A REPLACEABLE WEARING PART TO AN IMPLEMENT

(71) Applicant: KVERNELAND GROUP OPERATIONS NORWAY AS, Kvernaland (NO)

(72) Inventor: Magne Skjæveland, Klepp St. (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 2 days.

(21) Appl. No.: 14/402,809

(22) PCT Filed: May 21, 2013

(86) PCT No.: PCT/NO2013/050089
§ 371 (c)(1),
(2) Date: Nov. 21, 2014

(87) PCT Pub. No.: WO2013/176551
PCT Pub. Date: Nov. 28, 2013

(65) Prior Publication Data
US 2015/0128460 A1 May 14, 2015

(30) Foreign Application Priority Data
May 23, 2012 (NO) .................................. 20120603

(51) Int. Cl.
*E02F 9/28* (2006.01)
*A01B 23/02* (2006.01)

(52) U.S. Cl.
CPC ............. *A01B 23/02* (2013.01); *E02F 9/2825* (2013.01); *E02F 9/2858* (2013.01)

(58) Field of Classification Search
CPC ...... A01B 15/06; A01B 23/02; A01B 23/06; E02F 9/2808; E02F 9/2841; E02F 9/2825; E02F 9/2833; E02F 9/2858
USPC ............ 37/446, 452–457; 172/747, 749, 753
See application file for complete search history.

(56) References Cited

U.S. PATENT DOCUMENTS

| 783,764 | A | * | 2/1905 | Thomas | ................ | E02F 9/2825 |
| | | | | | | 37/452 |
| 2,968,880 | A | * | 1/1961 | Petersen | ............... | E02F 9/2841 |
| | | | | | | 175/391 |

(Continued)

FOREIGN PATENT DOCUMENTS

| AU | 3373684 A | 6/1985 |
| EP | 1 259 105 B1 | 4/2006 |

(Continued)

*Primary Examiner* — Robert Pezzuto
(74) *Attorney, Agent, or Firm* — Foley & Lardner LLP

(57) ABSTRACT

An assembly for attaching a replaceable wearing part to a leading edge of an implement includes a wearing-part holder configured to be received and fixed to a supporting surface formed at the leading edge of the implement and a replaceable wearing part. One of the wearing-part holder and the wearing part forms an attachment projection and the other of the wearing-part holder and the wearing part forms a corresponding socket. The attachment projection and the socket are provided with corresponding, cooperating guide portions. The guide portions of the wearing-part holder are formed as guide faces racing the supporting surface and being slanted relative to the supporting surfaces in a direction falling when moving away from the leading edge.

7 Claims, 4 Drawing Sheets

(56) References Cited

U.S. PATENT DOCUMENTS

| | | |
|---|---|---|
| 3,426,459 A | 2/1969 | Petersen |
| 3,897,642 A * | 8/1975 | Helton .................. E02F 9/2833 172/713 |
| 4,638,868 A | 1/1987 | Johnson et al. |
| 4,754,816 A * | 7/1988 | Edmission ............. A01B 23/02 172/747 |
| 7,658,024 B2 * | 2/2010 | Launder .................... E02F 9/28 299/102 |
| 8,528,238 B2 | 9/2013 | Skjaeveland |
| 8,875,424 B2 * | 11/2014 | Moller .................. A01B 15/06 37/452 |
| 2003/0037936 A1 | 2/2003 | Skjaeveland |

FOREIGN PATENT DOCUMENTS

| | | |
|---|---|---|
| GB | 1 342 592 A | 1/1974 |
| NO | 20093547 A1 | 6/2011 |
| WO | WO 2011/074983 A1 | 6/2011 |
| WO | WO 2011/127536 A1 | 10/2011 |

* cited by examiner

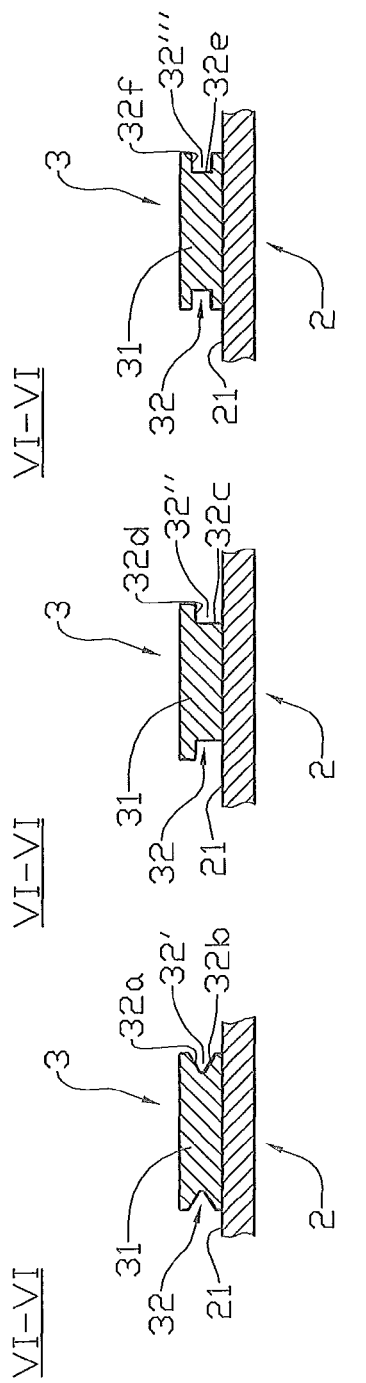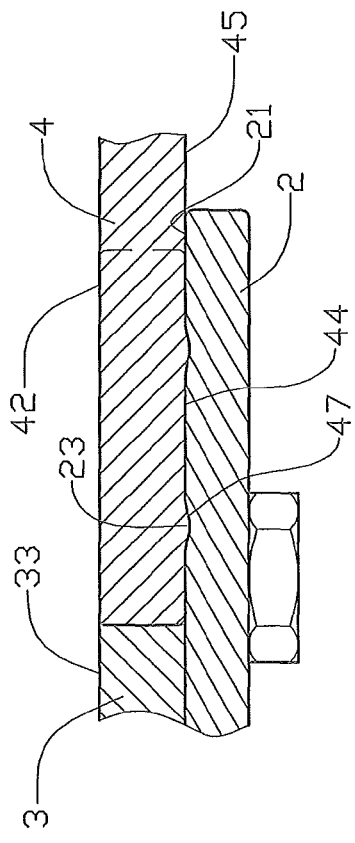

ASSEMBLY FOR ATTACHING A REPLACEABLE WEARING PART TO AN IMPLEMENT

A device for the attachment of a replaceable wearing part to be attached at a leading edge of an implement is described, wherein, at the leading edge, a supporting surface has been formed, which is arranged to receive and secure a wearing-part holder, one of the wearing-part holder and the wearing part forming an attachment projection and the other of the wearing-part holder and the wearing part forming a corresponding socket, and the attachment projection and the socket being provided with corresponding, cooperating guide portions.

BACKGROUND

From an implement that is provided with a cutting edge, an edge, a tine, tooth or the like arranged to work against and move an unconsolidated mass, for example earth, gravel, shingle and so on, it is known to use replaceable wearing parts to increase the durability of the portion/portions that is/are subjected to heavy wear. The applicant's own patent publication EP 1259105 discloses such a wearing part for mounting on a leading edge of an implement, a holder being arranged on the implement and forming at least a portion of the leading edge, and the wearing part being provided with cooperating guide elements forming a slidable fit of the socket-and-projection type for quick replacement of the wearing part without the use of fasteners or means other than a striking tool. EP 1259105 is included in its entirety in this description by reference.

The applicant's own NO 20093547 (corresponding to WO 2011/074983) discloses a corresponding system, but in which the wearing part is additionally formed with an elevation to direct the flow of earth away from an associated wearing-part holder. NO 20093547 is included in its entirety in this description by reference.

SUMMARY

The invention has for its object to remedy or reduce at least one of the drawbacks of the prior art or at least provide a useful alternative to the prior art.

The object is achieved through features which are specified in the description below and in the claims that follow.

In what follows, unless something else is expressly mentioned, the term "length" is to be understood as the extent of an element in the operative moving direction of a wearing part when the wearing part is arranged on the leading edge of an implement, possibly the extent of an axis lying in a plane coinciding with said moving direction. Unless something else is expressly mentioned, the term "width" is then to be understood as the extent of the element perpendicularly to said plane coinciding with the operative moving direction of the wearing part. Unless something else is explicitly mentioned, the term "height" is then understood as the extent of the element up from a plane coinciding with the side face of the wearing part on which the element is arranged.

For a leading edge of an implement which is provided with a cutting edge, an edge, a tine, tooth or the like arranged to work against and move an unconsolidated mass, for example earth, gravel, shingle and so on, a replaceable wearing part is arranged, an attachment portion on the implement and said wearing part being provided with cooperating guide portions which, in a horizontal projection, extend substantially in the operative moving direction of the implement. The wearing part and the attachment portion are of the socket-and-pin type as the wearing part may be driven into frictional engagement with the attachment portion by means of a force that acts substantially in the longitudinal direction of the guide portion, for example by the use of a striking tool, to take a correct working position without fasteners in the form of screws, bolts or the like being used. The attachment portion is arranged in association with a supporting surface, for example by a bracket that forms one of said socket and projection resting against the supporting surface, typically a ploughshare, a cultivator tine or a front portion of a loader bucket (also called a bucket jaw), and the wearing part exhibits at least one abutment portion which, when the wearing part is placed in its working position, rests against said supporting surface. Said abutment portion is brought to rest against the supporting surface by the guide portions of at least one of said socket and projection being slanted relative to the supporting surface, the guide portions exhibiting a decreasing distance to the supporting surface in the direction away from the leading edge of the implement. When the wearing part is being fitted, friction, in addition to the friction between the corresponding guide portions, will arise between the abutment portion(s) of the wearing part and the supporting surface. This ensures a better attachment of the wearing part on the implement than what is achieved with the prior-art socket-and-pin type of attachment.

The invention relates more specifically to a wearing-part holder for the attachment of a replaceable wearing part to be attached at a leading edge of an implement in which, at the leading edge, a supporting surface is formed which is arranged to receive and secure the wearing-part holder, one of the wearing-part holder and the wearing part forming an attachment projection and the other of the wearing-part holder and the wearing part forming a corresponding socket, and the attachment projection and socket being provided with corresponding, cooperating guide portions, the guide portions of the wearing-part holder being formed as guide faces facing the supporting surface and being slanted relative to the supporting surface, falling in a direction away from the leading edge, characterized in that the wearing part includes one or more abutment portions which, when the wearing part is fixed in the wearing-part holder, rest supportingly against the supporting surface.

The guide faces may be formed as upper side faces in recesses formed in the attachment projection or the socket.

The wearing part may include one or more abutment portions which are provided with one or more elevations which, when the wearing part is fixed in the wearing-part holder, are resting supportingly against the supporting surface.

The elevations may at least partially be accommodated in a corresponding recess arranged in the supporting surface.

The wearing part may include one or more serrated abutment portions.

The supporting surface may be arranged on a leading edge element taken from the group consisting of a tine, a share and a bucket jaw.

BRIEF DESCRIPTION OF THE DRAWINGS

In what follows, an example of a preferred embodiment is described, which is visualized in the accompanying drawings, in which:

FIGS. 7a, 7b and 7c show cross sections VI-VI according to FIG. 3, where FIG. 7a shows the profiled abutment surfaces of the wearing-part holder as substantially V-shaped grooves, FIG. 7b shows the profiled abutment surfaces of the wearing-part holder as side faces in recesses extending inward and upwards from a lower outer boundary of an attachment projection, and FIG. 7c shows the profiled abutment surfaces of the wearing-part holder as side faces in a groove with a substantially rectangular cross section; and FIG. 8 shows, on a larger scale, a cross section of an embodiment of the abutment portion of the wearing part provided with elevations and a supporting surface provided with corresponding recesses.

DETAILED DESCRIPTION

Figure 1:
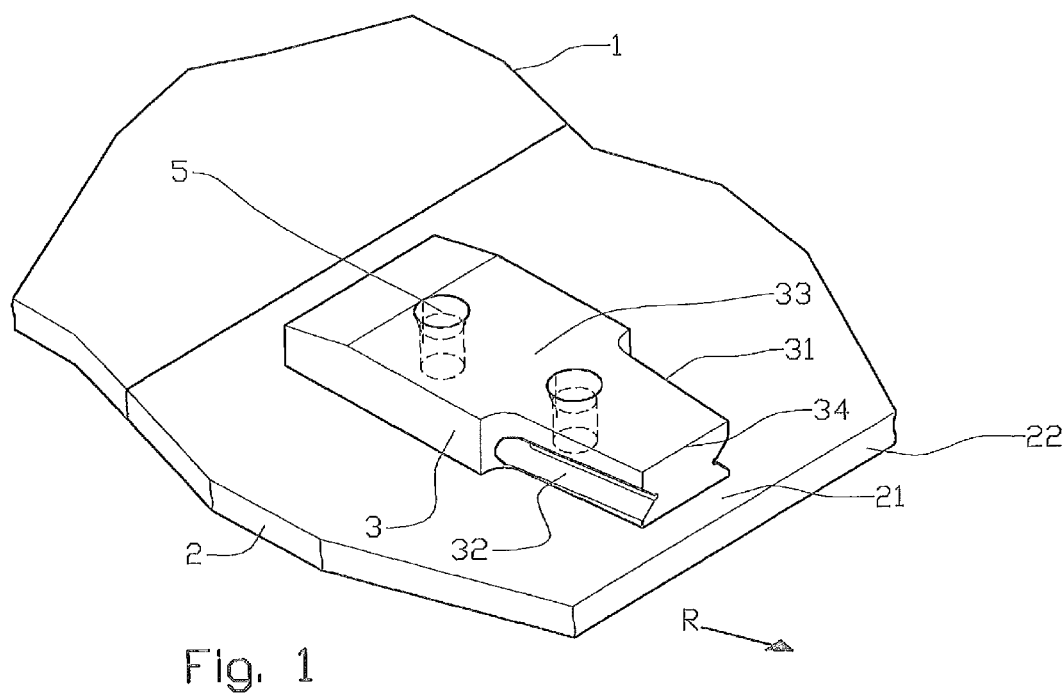
FIG. 1 shows, in perspective, a wearing-part holder according to the invention arranged on a leading edge element of an implement.
Figure 2:
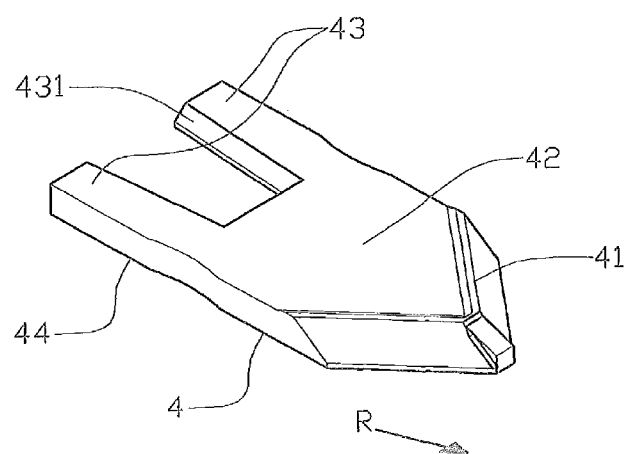
FIG. 2 shows, in perspective, a corresponding replaceable wearing part according to the invention.

In what follows, reference being made to the drawings, preferred exemplary embodiments of a replaceable wearing part according to the invention will now be described, adapted for mounting on an implement with one or more working, leading edges or fronts which are arranged to work in a specific material and which are subjected to wear over time.

The preferred exemplary embodiments that are described are connected to agricultural implements for use in agricultural operations, but it will be understood that the invention has a wider application as it may be used on replaceable working shares of a kind known per se, and for other types and combinations of work tools that require replaceable working shares to be fitted thereon, fixed by a wearing-part holder, whose lifetime should desirably be extended.

On an implement 1, a leading edge element 2 is arranged. The edge element 2 may be formed as a replaceable share on a plough or as a levelling share, a jaw on a loader bucket, an end portion of a cultivator tine and so on. A surface portion of the edge element 2 forms a supporting surface 21 which extends in the working direction R of the implement, rearwards from a leading edge 22. On said supporting surface 21, a wearing-part holder 3 is fixed, shown here as attached to the edge element 2 by means of attachment bolts 5 passing through a portion of the wearing-part holder 3 and the edge element 2. The wearing-part holder 3 is provided with an attachment projection 31 which includes profiled abutment surfaces 32 which are arranged to engage corresponding attachment portions 431 of a socket 43 of a replaceable wearing part 4. The abutment surfaces 32 include both portions arranged for lateral control of the wearing part 4 and portions arranged to guide the wearing part 4 into abutment against said supporting surface 21 (vertical control), see the more detailed description below. The wearing-part holder 3 is provided with a sliding surface 33 which is defined towards the wearing part 4 by a leading sliding-surface edge 34.

The replaceable wearing part 4 is provided with a front portion 41 which, in the exemplary embodiment shown, has the shape of a point arranged to easily penetrate into a mass in which the implement 1 is to be moved. The wearing part 4 is provided with a sliding surface 42 which, in the normal working direction R of the implement 1, is arranged upstream of the wearing-part holder 3, the sliding surface 33 of the wearing-part holder 3 and the sliding surface 42 of the wearing part 4 forming a substantially uninterrupted sliding surface.

The abutment surfaces 32 of the wearing-part holder 3 and the attachment portions 431 of the wearing part 4 are, in what follows, also termed cooperating guide portions.

In a first embodiment, the profiled abutment surfaces 32 of the wearing-part holder 3 are provided as substantially V-shaped grooves 32' (see in particular FIG. 7a). Slanted side faces 32a, 32b in grooves of this kind form both a lateral guide and a vertical guide, that is to say a guide in a direction perpendicular to the supporting surface 21.

In a second embodiment (see FIG. 7b), the abutment surfaces 32 are provided as side faces 32c, 32d in recesses 32" extending inwards and upwards from the lower, outer boundary of the attachment projection 31, the attachment projection 31 exhibiting a T-profile. Vertical side faces 32c form the lateral guide and horizontal side faces 32d form the vertical guide.

In a third embodiment (see FIG. 7c), the abutment surfaces 32 are provided as side faces 32e, 32f in a groove 32''' with a substantially rectangular cross section. Vertical side faces 32e form the lateral guide, and horizontal side faces 32f form the vertical guide.

Other ways of providing said abutment surfaces 32 are possible as well, for example by combining the principles shown in FIGS. 7a, 7b and 7c.

The present guide faces in the form of, respectively, the slanted faces 32a of the V-profile grooves 32', horizontal side faces 32d of the recesses 32", and the horizontal side faces 32f of the rectangular-profile grooves 32''' are slanted at an angle α (see FIG. 3) towards said supporting surface 21 in the direction away from the leading edge 22. In a first exemplary embodiment (see FIGS. 3 and 4), the corresponding attachment portions 431 on the socket 43 of the wearing part 4 are slanted correspondingly so that said sliding surfaces 33, 42 lie in fairly coinciding planes when the wearing part 4 is fixed to the wearing-part holder 3. In a second exemplary embodiment (see in particular FIGS. 5 and 6), said attachment portions 431 on the socket 43 of the wearing part 4 are parallel to the sliding surface 42 of the wearing part.

The wearing part 4 includes an abutment portion 44 which, as the wearing part 4 is being connected to the wearing-part holder 3, is forced against the supporting surface 21 of the leading edge element 2 by the slant of the grooves 32' and horizontal side faces 32d, respectively. Thereby friction arises between the abutment portion 44 of the wearing part 4 and the supporting surface 21 of the edge element 2 lying below, and this helps to reduce the risk of the wearing part 4 unintentionally being loosened from the implement 1, for example in a situation in which the implement 1 is moved opposite to the ordinary working direction R.

Figure 3:
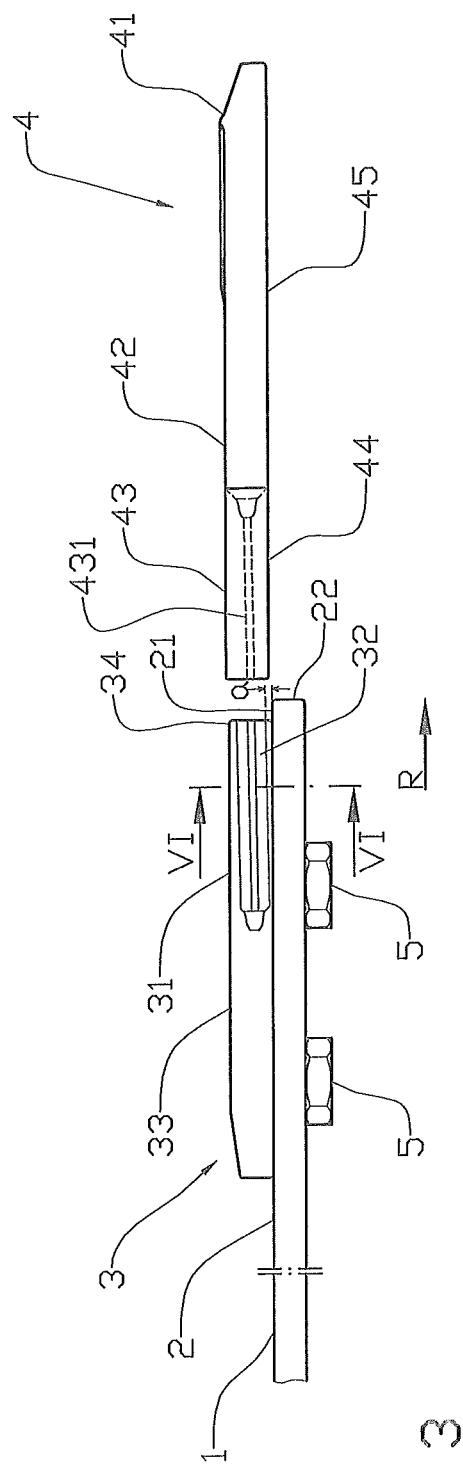
FIG. 3 shows, in a side view, a first embodiment of the arrangement according to the invention, in which the wearing part is positioned for connection to the wearing-part holder.
Figure 4:
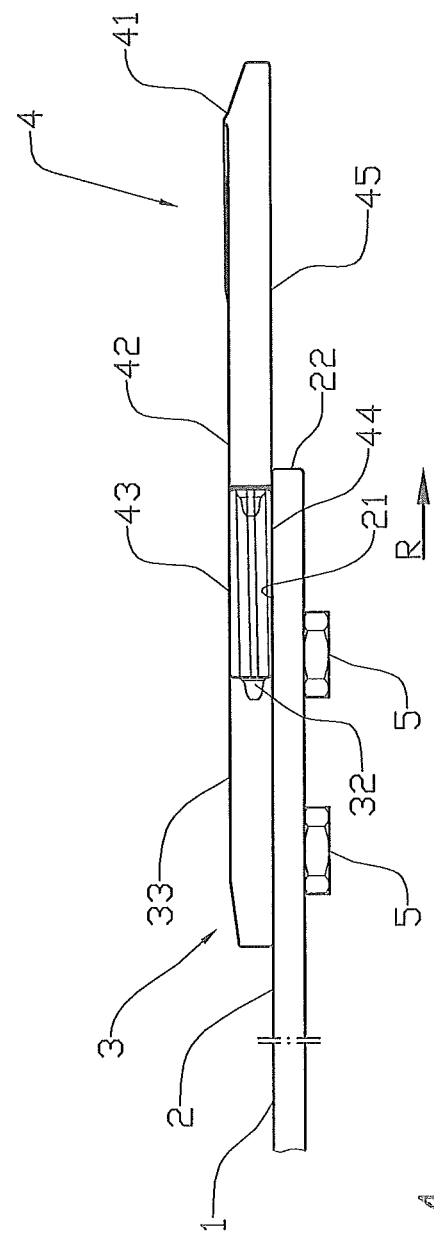
FIG. 4 shows, in a side view, a first embodiment of the arrangement according to the invention, in which the wearing part is connected to the wearing-part holder.
Figure 5:
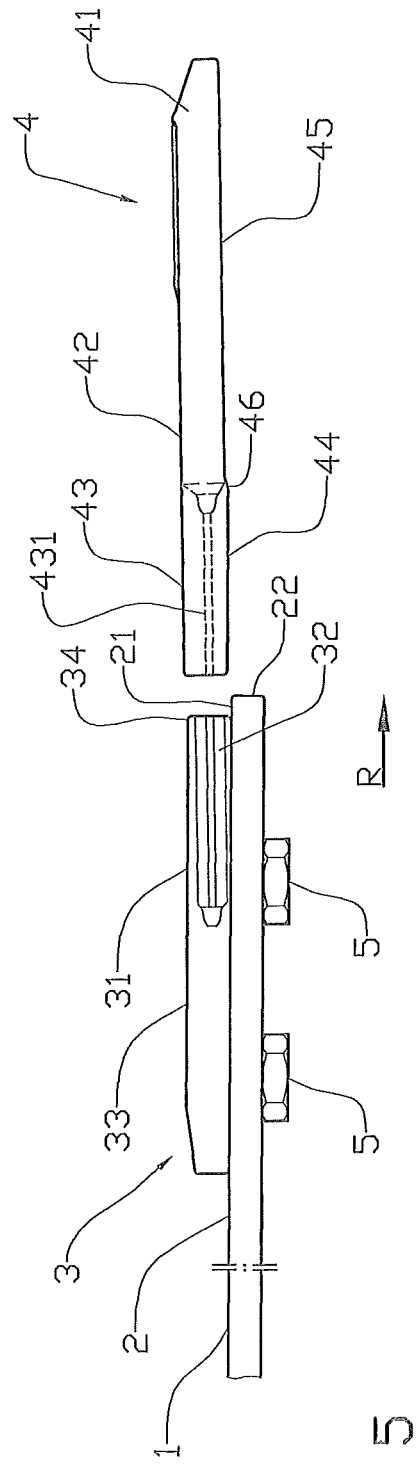
FIG. 5 shows, in a side view, a second embodiment of the arrangement according to the invention, in which the wearing part is positioned for connection to the wearing-part holder.
Figure 6:
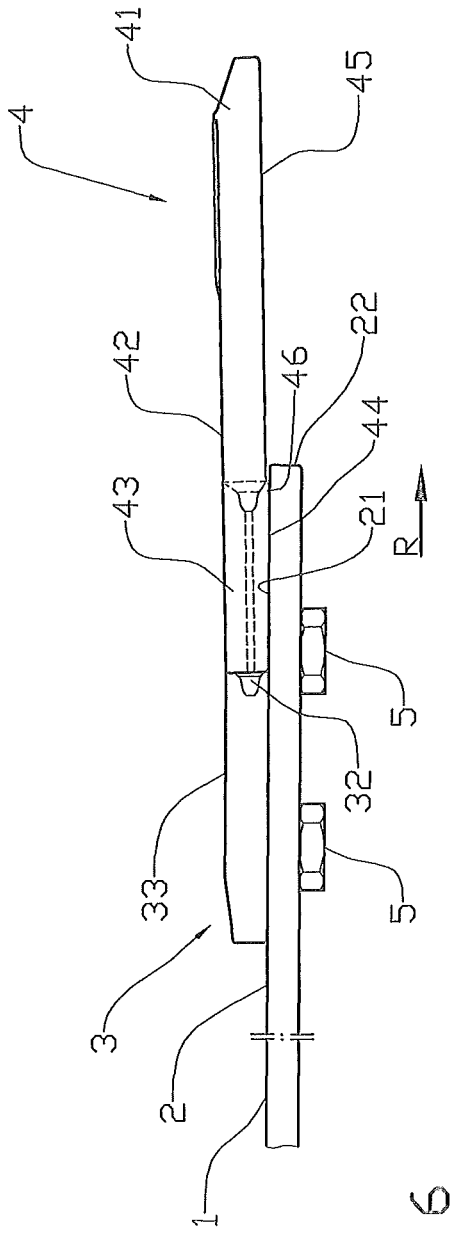
FIG. 6 shows, in a side view, a second embodiment of the arrangement according to the invention, in which the wearing part is connected to the wearing-part holder.

The abutment portion 44 forms a rear portion of a bottom face 45 of the wearing part 4, that is to say opposite said sliding surface 42. The abutment portion 44 may be formed flush with the rest of said bottom face 45 as it is shown in FIGS. 3 and 4, or the abutment portion may be formed as first elevations 46 projecting downwards from the bottom side of the wearing part 4 to compensate for the slant of the wearing part 4 relative to the supporting surface 21, as it is shown in FIGS. 5 and 6.

In FIG. 8, the abutment portion 44 is shown as provided with several downward-projecting second elevations 47 which extend transversely to the longitudinal direction of the wearing part 4 and, when the wearing part 4 has been fixed in the wearing-part holder 3, project into corresponding recesses 23 in the supporting surface 21. The abutment portion 44 may also be serrated or treated in some other way to provide sufficient friction between the abutment portion 44 and the supporting surface 21.

When the wearing part 4 is to be attached to the implement 1, it is moved with the socket 43 towards the attachment projection 31 of the wearing-part holder 3 so that the complementary abutment surfaces 32 and attachment portions 431 slidingly engage with each other. By means of a striking tool (not shown), the wearing part 4 is driven onto the wearing-part holder 3 as, through the slant of the guide portions 32 relative to the supporting surface 21, the abutment portion 44 of the wearing part 4 is moved into abutment against the supporting surface 21.

When the wearing part 4 is being dismantled, it is driven away from the wearing-part holder 3 by hits against an appropriate portion of the wearing part 4.

The invention claimed is:

1. An assembly for attaching a replaceable wearing part to a leading edge of an implement, the assembly comprising:
    a wearing-part holder configured to be received on and fixed to a supporting surface formed at the leading edge of the implement; and
    the replaceable wearing part including at least one abutment portion that rests supportingly against the supporting surface when the replaceable wearing part is attached to the wearing-part holder,
    wherein one of the wearing-part holder and the replaceable wearing part forms an attachment projection, and the other of the wearing-part holder and the replaceable wearing part forms a corresponding socket,
    wherein the attachment projection and the socket are each provided with corresponding, cooperating guide portions, the guide portions being formed as guide faces facing the supporting surface and being downwardly slanted relative to the supporting surface from a first end of each guide face proximal to the leading edge to a second end of each guide face distal to the leading edge.

2. The assembly in accordance with claim 1, wherein the guide faces are formed as upper side faces in recesses formed in the attachment projection or the socket.

3. The assembly in accordance with claim 1, wherein the at least one abutment portion of the replaceable wearing part is provided with at least one elevation which, when the replaceable wearing part is attached to the wearing-part holder, rests supportingly against the supporting surface.

4. The assembly in accordance with claim 3, wherein the at least one elevation is accommodated at least partially in a corresponding recess arranged in the supporting surface.

5. The assembly in accordance with claim 1, wherein the replaceable wearing part includes at least one serrated abutment portion.

6. The assembly in accordance with claim 1, wherein the leading edge is selected from the group consisting of a tine, a share and a bucket jaw.

7. The assembly in accordance with claim 1, wherein the assembly is configured such that when the replaceable wearing part is attached to the wearing-part holder, an upper surface of the replaceable wearing part and an upper surface of the wearing-part holder are coplanar.

* * * * *